C. R. STRAUGHN.
COMBINED RAKE AND TEDDER.
APPLICATION FILED OCT. 30, 1916.

1,222,815.

Patented Apr. 17, 1917.
3 SHEETS—SHEET 1.

Inventor:
Charles R. Straughn,
By R. V. Towts
Attorney.

Inventor:
Charles R. Straughn,

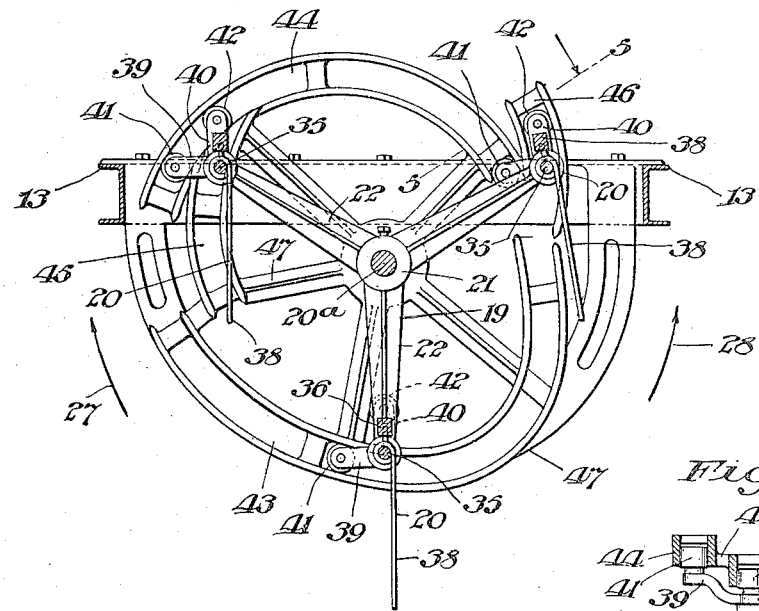
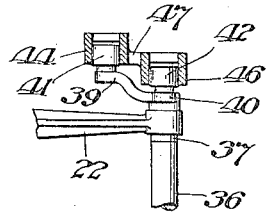
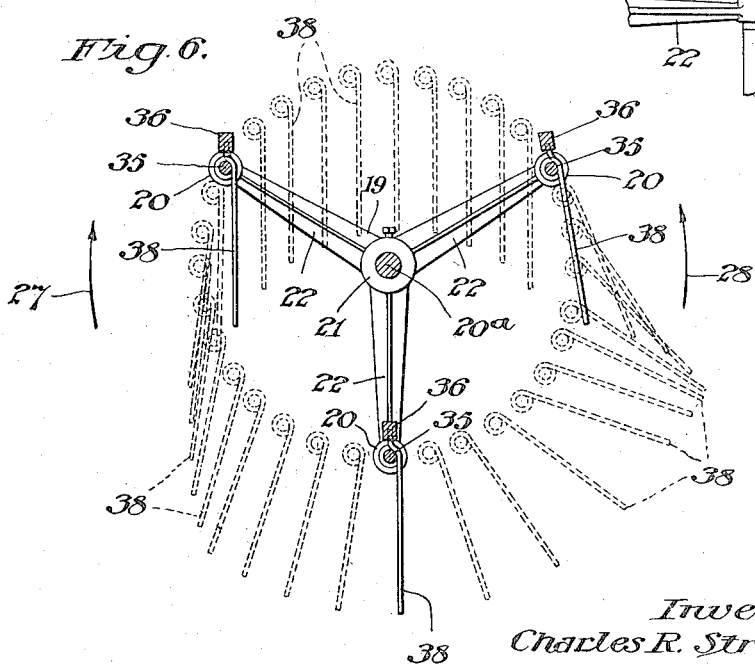

UNITED STATES PATENT OFFICE.

CHARLES R. STRAUGHN, OF PHILADELPHIA, PENNSYLVANIA.

COMBINED RAKE AND TEDDER.

1,222,815.  Specification of Letters Patent.  Patented Apr. 17, 1917.

Application filed October 30, 1916. Serial No. 128,372.

*To all whom it may concern:*

Be it known that I, CHARLES R. STRAUGHN, a citizen of the United States, residing at Philadelphia, in the county of Philadelphia and State of Pennsylvania, have invented certain new and useful Improvements in Combined Rakes and Tedders, of which the following is a specification.

My invention relates to improvements in hay rakes and tedders; and the object of my invention is to provide a machine of novel, simple and efficient construction wherein a rake member or members are carried by a rotatable member and governed by a cam or cams on the machine frame in such a manner that the machine may be operated either as a rake or as a tedder and wherein lost motion between the working parts will be reduced to a minimum and the rake members will be firmly and positively guided through their path of travel. When the machine is operating as a rake it may be used to rake hay either into predetermined positions in the field or onto a suitable loading device or machine.

My invented machine consists of the elements and the combinations of them hereinafter fully described and particularly claimed.

In the accompanying drawings, illustrating my invention:

Fig. 4 is a vertical section, on line 4—4 of Fig. 1.

Fig. 5 is a sectional detail, on line 5—5 of Fig. 4, showing two of the cams and adjuncts.

Fig. 6 is a diagrammatic view showing different positions of the rakes during the operation of the machine.

Figure 1:
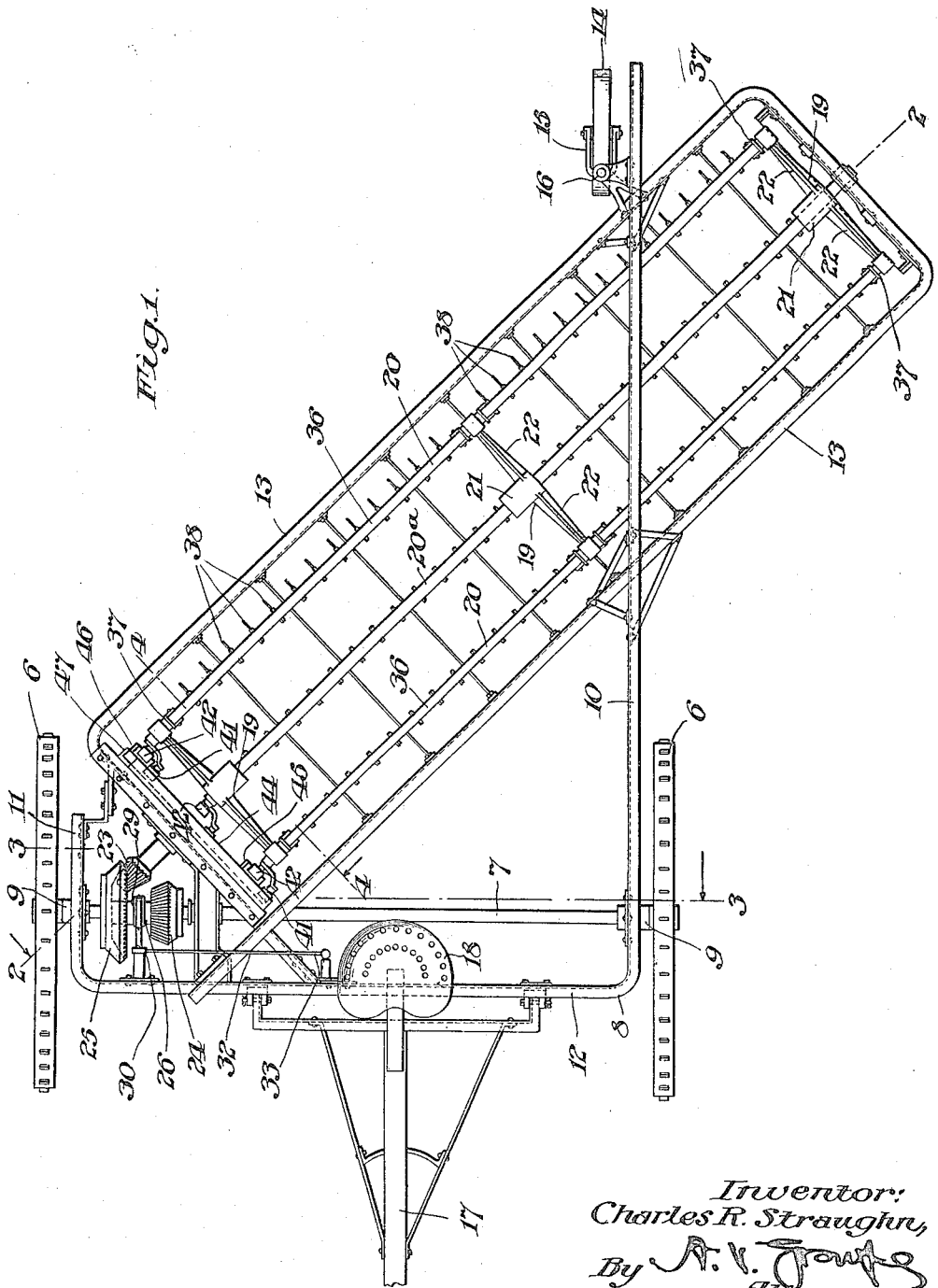
Figure 1 is a top view of a combined rake and tedder embodying my invention.
Figure 2:
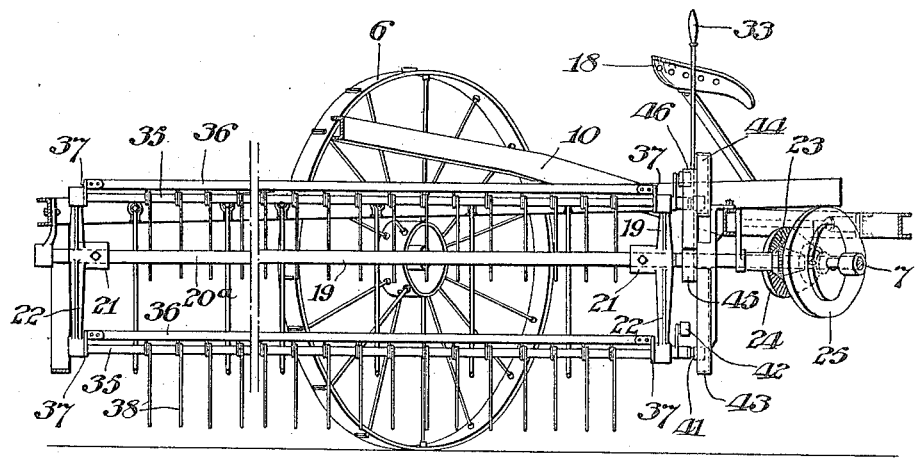
Fig. 2 is a vertical section, on line 2—2 of Fig. 1.
Figure 3:
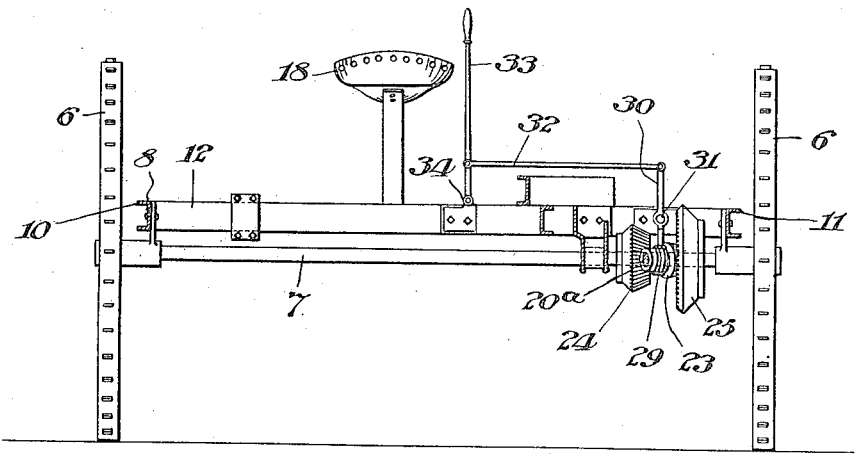
Fig. 3 is a vertical section on line 3—3 of Fig. 1.

Referring to the drawings, 6 designates a pair of carrying wheels which are secured on the ends of an axle 7. The axle 7 supports the forward end of the machine frame 8 which is provided with bearings 9 in which the axle 7 turns. The bearings 9 are secured to parallel bars 10 and 11 of the frame 8. The bars 10 and 11 are connected by a bar 12 and the frame 8 includes a rectangular structure 13 which is suitably connected to the bars 10, 11 and 12 and which extends obliquely to the direction of travel of the machine beneath the bar 10. The bar 10 extends rearwardly and is provided near its rearward end with a trailing carrying wheel 14 journaled on a bracket 15 which is pivoted, at 16, to a bracket on the bar 10. The bar 12 is provided with a suitable tongue 17 by means of which the machine may be drawn over the ground; and the machine is provided with a suitable seat 18 for the driver.

Extending through the frame structure 13 is a rotatable member 19 which comprises a shaft 20ᵃ journaled in bearings in the ends of the frame structure 13, and collars 21 secured on the shaft 20 and having radially extending arms 22.

The shaft 20ᵃ extends forwardly of the frame structure 13 and is provided on its forward end with a beveled gear wheel 23 adapted to be engaged by either one of two beveled gear wheels 24 and 25. The gear wheels 24 and 25 are formed on or secured to a sleeve 26 which is splined on the axle 7 so as to turn therewith and to be longitudinally movable thereon to bring either the gear wheel 24 or the gear wheel 25 into mesh with the gear wheel 23. When the gear wheel 24 is in mesh with the gear wheel 23 the member 19 will be turned in the direction of the arrows 27 in Figs. 4 and 6, as the machine is drawn forwardly over the ground; and when the gear wheel 25 is in mesh with the gear wheel 23, the member 19 will be turned in the direction of the arrows 28 in Figs. 4 and 6, for purposes hereinafter explained.

The sleeve 26 is provided with a circumferential groove 29 and is adapted to be engaged by the lower forked end of a lever 30 which enters the groove 29. The lever 30 is fulcrumed, at 31, on the frame bar 12 and its upper end is connected to one end of a bar 32. The other end of the bar 32 is connected to a hand lever 33 which is fulcrumed at 34 on the frame bar 12 and which is located adjacent to the driver's seat 18 for convenience of operation. By moving the hand lever 33, the lever 30 may be operated to move the sleeve 26 to bring either the gear wheel 24 or the gear wheel 25 into mesh with the gear wheel 23 to rotate the member 19 in either direction desired.

The rotatable member 19 carries rakes 20, in the present instance three in number.

These rakes extend parallel to the shaft 20ª between the arms 22; and each rake 20 comprises a shaft 35 mounted to turn in the arms 22, a bar 36 extending parallel to the shaft 35 above the same and secured thereto by brackets 37, and suitable spaced tines 38 secured to the bar 36 and extending around and projecting from the shaft 35, as shown. The forward end of each rake shaft 35 has a collar secured thereto and provided with two arms 39 and 40 which project from the shaft 35 at different angles and which are provided on their outer ends with anti-friction rollers 41 and 42, respectively. The rollers 41 are located forwardly of the rollers 42; and, during the rotation of the member 19, the rollers 41 traverse a path in one plane while the rollers 42 traverse a path in another plane. The rollers 41 are adapted to pass through one pair of cams 43 and 44 and across the spaces between the ends of the cams, and the rollers 42 are adapted to pass through another pair of cams 45 and 46 and across the spaces between the cams during the rotation of the member 19. These cams are formed on a casting 47 which is secured to the frame section 13, the cams 43 and 44 being in the plane of the path of travel of the rollers 41, and the cams 45 and 46 being in the plane of the path of travel of the rollers 42. The cams of one pair extend across the spaces between the end portions of the cams of the other pair and the cams are so related to each other that there will always be a roller of each rake engaged with a cam to hold the rakes in proper position and govern their movement during the rotation of the member 19. During the rotation of the member 19 in the direction of the arrows 27 in Figs. 4 and 6, the rollers 41 successively pass from the cam 43 as the rollers 42 successively enter the cam 45, the rollers 42 successively pass from the cam 45 as the rollers 41 successively enter the cam 44, the rollers 41 successively pass from the cam 44 as the rollers 42 successively enter the cam 46, and the rollers 42 successively pass from the cam 46 as the rollers 41 successively enter the cam 43; and the reverse of this operation takes place during the rotation of the member 19 in the direction of the arrows 28 in Figs. 4 and 6.

It will be observed that the paths of travel of the rollers 41 and 42 cross each other. This with the employment of two rollers for each rake is an important feature of my invention, as it reduces lost motion between the parts to a minimum and provides for the firm and positive control of the rakes at all times and under all conditions.

When the member 19 is rotated in either direction the cams 43, 44, 45 and 46 cause the tines 38 to progressively assume the different positions shown diagrammatically in Fig. 6, causing forwardly moving lower tines 38 to assume the proper positions for the machine to act as a rake when the member 19 is rotated in the direction of the arrows 27; and causing the rearwardly moving lower tines 38 to assume the proper positions to toss the hay and for the machine to act as a tedder when the member 19 is rotated in the direction of the arrows 28.

It will of course be understood that when it is desired to have the machine act as a rake, the hand lever 33 is operated to shift the gear wheel 24 into mesh with the gear wheel 23, causing the rotation of the member 19 in the direction of the arrows 27, during the forward movement of the machine; and that when it is desired to have the machine act as a tedder, the hand lever 33 is operated to shift the gear wheel 25 into mesh with the gear wheel 23, causing the rotation of the member 19 in the direction of the arrows 28.

I claim:

1. The combination of a supporting frame, carrying wheels therefor, a member rotatably mounted on the frame, means operative to rotate the member in either direction, a rake bar pivoted on the member and provided with two rollers, and cams on the frame guiding the rollers through paths which cross each other and constantly governing the movement of the rake during successive rotations of the member in either direction for use as either a rake or a tedder.

2. The combination of a supporting frame, carrying wheels therefor, a member rotatably mounted on the frame, means operative to rotate the member, a rake bar pivoted on the member and provided with two rollers each traversing a path in a plane different from the plane of the path of the other during the rotation of the member, and cams on the frame and located in said planes and coöperating with the rollers and constantly governing the movement of the rake during successive rotations of the member.

3. The combination of a supporting frame, carrying wheels therefor, a member rotatably mounted on the frame, means operative to rotate the member, a rake bar pivoted on the member and provided with two rollers each traversing a path in a plane different from the plane of the path of the other during the rotation of the member, a pair of spaced cams on the frame in the plane of the path of one of the rollers and coöperating therewith, a pair of spaced cams on the frame in the path of the other roller and coöperating therewith, said cams governing the movement of the rake during the rotation of the member, each roller passing through its cams and through the spaces between the ends thereof and one roller being engaged with one cam at all times.

4. The combination of a supporting frame, carrying wheels therefor, a member mounted on the frame to rotate either forward or backward, a rake bar pivoted on the member and provided with two rollers, cams on the frame guiding the rollers over paths which cross each other and constantly governing the movement of the rake during successive rotations of the member in either direction, and means operative to rotate the member in either direction.

5. The combination of a supporting frame, carrying wheels therefor, a member comprising a shaft rotatably mounted on the frame and spaced arms projecting from the shaft, a rake including a shaft extending between and mounted to turn in said arms, an arm projecting from the rake shaft and carrying a pair of rollers, cams on the frame guiding the rollers over paths which cross each other and constantly governing the movement of the rake during successive rotations of the member, and means operative to rotate the member in either direction for use as either a rake or a tedder.

In testimony whereof I affix my signature hereto.

CHARLES R. STRAUGHN.

Copies of this patent may be obtained for five cents each, by addressing the "Commissioner of Patents, Washington, D. C."